(12) United States Patent
Flaugher et al.

(10) Patent No.: US 11,203,006 B2
(45) Date of Patent: Dec. 21, 2021

(54) METHOD OF USE FOR A SOLID FORM ADSORBENT

(71) Applicants: David Victor Flaugher, Beavercreek, OH (US); Rodney Lee Dobson, Greer, SC (US); David S. Kress, Algood, TN (US)

(72) Inventors: David Victor Flaugher, Beavercreek, OH (US); Rodney Lee Dobson, Greer, SC (US); David S. Kress, Algood, TN (US)

(73) Assignee: FLOW DRY TECHNOLOGY, INC., Brookville, OH (US)

( * ) Notice: Subject to any disclaimer, the term of this patent is extended or adjusted under 35 U.S.C. 154(b) by 0 days.

(21) Appl. No.: 17/003,585

(22) Filed: Aug. 26, 2020

(65) Prior Publication Data

US 2020/0391182 A1    Dec. 17, 2020

Related U.S. Application Data

(62) Division of application No. 15/819,554, filed on Nov. 21, 2017, now Pat. No. 10,773,239.

(Continued)

(51) Int. Cl.
*B01J 20/28* (2006.01)
*B01D 53/28* (2006.01)
(Continued)

(52) U.S. Cl.
CPC .... *B01J 20/28026* (2013.01); *B01D 53/0407* (2013.01); *B01D 53/261* (2013.01);
(Continued)

(58) Field of Classification Search
CPC ........ B01J 20/041; B01J 20/045; B01J 20/08; B01J 20/103; B01J 20/12; B01J 20/16;
(Continued)

(56) References Cited

U.S. PATENT DOCUMENTS 2,960,727 A   11/1960   Bradshaw et al.
3,067,469 A   12/1962   Yarrison
(Continued)

FOREIGN PATENT DOCUMENTS

CN   1935994     3/2007
EP   0432438     11/1990
(Continued)

OTHER PUBLICATIONS

Safarik, I. et al., "Magnetically Modified Microbial Cells: A New Type of Magnetic Adsorbents", China Particuology, vol. 5.1, pp. 19-25 (2007).

(Continued)

*Primary Examiner* — Youngsul Jeong
*Assistant Examiner* — Jason Y Chong
(74) *Attorney, Agent, or Firm* — Thompson Hine LLP

(57) ABSTRACT

A method including adding to or positioning in a vehicle air conditioning system a solid form adsorbent. The solid form adsorbent includes a plurality of discrete adsorbent particles spatially bound in place by point bonding with a binder. At least about 25% of the external surface area of a majority of the particles is not sealed off by the binder and is available for adsorption.

18 Claims, 3 Drawing Sheets

Related U.S. Application Data

(60) Provisional application No. 62/435,164, filed on Dec. 16, 2016.

(51) Int. Cl.

| | | |
|---|---|---|
| *B01D 53/04* | (2006.01) | |
| *B01D 53/26* | (2006.01) | |
| *B01J 20/04* | (2006.01) | |
| *B01J 20/08* | (2006.01) | |
| *B01J 20/10* | (2006.01) | |
| *B01J 20/12* | (2006.01) | |
| *B01J 20/16* | (2006.01) | |
| *B01J 20/18* | (2006.01) | |
| *B01J 20/20* | (2006.01) | |
| *B01J 20/22* | (2006.01) | |
| *B01J 20/26* | (2006.01) | |
| *F25B 39/00* | (2006.01) | |
| *F25B 43/00* | (2006.01) | |
| *B01D 53/02* | (2006.01) | |
| *F25B 39/04* | (2006.01) | |

(52) U.S. Cl.
CPC ............ *B01D 53/28* (2013.01); *B01J 20/041* (2013.01); *B01J 20/045* (2013.01); *B01J 20/08* (2013.01); *B01J 20/103* (2013.01); *B01J 20/12* (2013.01); *B01J 20/16* (2013.01); *B01J 20/18* (2013.01); *B01J 20/20* (2013.01); *B01J 20/226* (2013.01); *B01J 20/261* (2013.01); *B01J 20/28004* (2013.01); *B01J 20/28047* (2013.01); *F25B 39/00* (2013.01); *F25B 43/003* (2013.01); *B01D 53/02* (2013.01); *B01D 2253/104* (2013.01); *B01D 2253/106* (2013.01); *B01D 2253/108* (2013.01); *B01D 2253/11* (2013.01); *B01D 2253/204* (2013.01); *B01D 2253/342* (2013.01); *B01D 2257/80* (2013.01); *B01D 2258/06* (2013.01); *B01D 2259/4566* (2013.01); *F25B 39/04* (2013.01); *F25B 2339/0441* (2013.01)

(58) Field of Classification Search
CPC . B01J 20/18; B01J 20/20; B01J 20/226; B01J 20/261; B01J 20/28004; B01J 20/28026; B01J 20/28047; F25B 39/00; F25B 39/04; F25B 43/003; F25B 2339/0441; B01D 53/02; B01D 53/0407; B01D 53/261; B01D 53/28; B01D 2253/104; B01D 2253/106; B01D 2253/108; B01D 2253/11; B01D 2253/204; B01D 2253/342; B01D 2257/80; B01D 2258/06; B01D 2259/4566

See application file for complete search history.

(56) References Cited

U.S. PATENT DOCUMENTS

| | | | |
|---|---|---|---|
| 3,152,363 A | 10/1964 | Honey et al. | |
| 3,258,513 A | 6/1966 | Berry et al. | |
| 3,405,206 A | 10/1968 | Abell et al. | |
| 3,611,678 A | 10/1971 | Holden | |
| 3,618,771 A | 11/1971 | Akers | |
| 3,645,072 A | 2/1972 | Clapham | |
| 3,954,927 A | 5/1976 | Duling et al. | |
| 3,971,373 A | 7/1976 | Braun | |
| 4,061,807 A | 12/1977 | Shaler et al. | |
| 4,067,847 A | 1/1978 | Yui et al. | |
| 4,093,105 A | 6/1978 | Russell et al. | |
| 4,194,040 A | 3/1980 | Breton et al. | |
| 4,431,456 A | 2/1984 | Kulprathipanja | |
| 4,664,683 A | 5/1987 | Degen et al. | |
| 4,668,566 A | 5/1987 | Braun | |
| 4,687,573 A | 8/1987 | Miller et al. | |
| 4,753,728 A | 6/1988 | VanderBilt et al. | |
| 4,772,300 A | 9/1988 | Cullen et al. | |
| 4,783,206 A | 11/1988 | Cullen et al. | |
| 4,797,318 A | 1/1989 | Brooker et al. | |
| 4,859,386 A | 8/1989 | VanderBilt et al. | |
| 4,900,377 A | 2/1990 | Redford et al. | |
| 5,017,318 A | 5/1991 | Vanderbilt et al. | |
| 5,019,311 A | 5/1991 | Koslow | |
| 5,033,465 A | 7/1991 | Braun et al. | |
| 5,064,311 A | 11/1991 | Giroux et al. | |
| 5,147,722 A | 9/1992 | Koslow | |
| 5,189,092 A | 2/1993 | Koslow | |
| 5,289,697 A * | 3/1994 | Hutchison ............. | F25B 43/003 62/474 |
| 5,331,037 A | 7/1994 | Koslow | |
| 5,356,852 A | 10/1994 | DeLiso et al. | |
| 5,432,214 A | 7/1995 | Yamazaki et al. | |
| 5,503,662 A | 4/1996 | Berger | |
| 5,593,626 A | 1/1997 | Yagishita | |
| 5,639,550 A | 6/1997 | Lisenko | |
| 5,641,088 A | 6/1997 | Berger | |
| 5,665,148 A | 9/1997 | Mühlfeld et al. | |
| 5,736,485 A | 4/1998 | Miller | |
| 5,792,513 A | 8/1998 | Koslow et al. | |
| 5,820,927 A | 10/1998 | Oehler et al. | |
| 5,833,784 A | 11/1998 | Berger | |
| 5,856,172 A | 1/1999 | Greenwood et al. | |
| 5,928,588 A | 7/1999 | Chen et al. | |
| 5,944,706 A | 8/1999 | Palumbo et al. | |
| 6,030,558 A | 2/2000 | Smith et al. | |
| 6,077,588 A | 6/2000 | Koslow et al. | |
| 6,152,996 A | 11/2000 | Linnersten et al. | |
| 6,399,188 B1 | 6/2002 | Smith et al. | |
| 6,432,872 B1 | 8/2002 | Tsushio et al. | |
| 6,540,916 B2 | 4/2003 | Patil | |
| 6,551,608 B2 | 4/2003 | Yao | |
| 6,554,886 B2 | 4/2003 | Yoshikawa et al. | |
| 6,589,320 B2 | 7/2003 | Incorvia et al. | |
| 6,720,054 B2 | 4/2004 | Koslow | |
| 6,770,204 B1 | 8/2004 | Koslow | |
| 6,772,535 B2 | 8/2004 | Koslow | |
| 6,783,798 B2 | 8/2004 | Koslow | |
| 6,793,866 B2 | 9/2004 | Kelly et al. | |
| 6,797,167 B2 | 9/2004 | Koslow | |
| 6,835,311 B2 | 12/2004 | Koslow | |
| 6,840,986 B1 | 1/2005 | Koslow | |
| 6,849,214 B2 | 2/2005 | Patil | |
| 6,866,704 B2 | 3/2005 | Koslow | |
| 6,872,311 B2 | 3/2005 | Koslow | |
| 6,887,924 B2 | 5/2005 | McKedy et al. | |
| 6,889,599 B2 | 5/2005 | Koslow | |
| 6,913,154 B2 | 7/2005 | Koslow | |
| 6,953,604 B2 | 10/2005 | Koslow | |
| 6,959,820 B2 | 11/2005 | Koslow | |
| 6,998,058 B2 | 2/2006 | Koslow | |
| 6,998,080 B2 | 2/2006 | Stadermann et al. | |
| 7,008,537 B2 | 3/2006 | Koslow | |
| 7,011,753 B2 | 3/2006 | Koslow | |
| 7,037,642 B2 | 5/2006 | Hei | |
| 7,112,280 B2 | 9/2006 | Hughes et al. | |
| 7,144,533 B2 | 12/2006 | Koslow | |
| 7,182,857 B2 | 2/2007 | Koslow et al. | |
| 7,238,403 B2 | 7/2007 | Koslow et al. | |
| 7,241,388 B2 | 7/2007 | Koslow | |
| 7,276,098 B2 | 10/2007 | Koslow | |
| 7,287,650 B2 | 10/2007 | Koslow | |
| 7,300,500 B2 | 11/2007 | Okada et al. | |
| 7,374,680 B2 | 5/2008 | Hughes et al. | |
| 7,566,014 B2 | 7/2009 | Koslow et al. | |
| 7,592,284 B2 | 9/2009 | Zaki et al. | |
| 7,655,112 B2 | 2/2010 | Koslow | |
| 7,794,737 B2 | 9/2010 | Fish et al. | |
| 7,922,008 B2 | 4/2011 | Bahm et al. | |
| 7,955,688 B2 | 6/2011 | Hanson et al. | |
| 7,989,388 B2 | 8/2011 | Incorvia et al. | |

(56) References Cited

U.S. PATENT DOCUMENTS

| | | |
|---|---|---|
| 8,012,575 B2 | 9/2011 | Müller |
| 8,056,733 B2 | 11/2011 | Koslow |
| 8,058,201 B2 | 11/2011 | Martinez et al. |
| 8,444,808 B2 | 5/2013 | Koslow et al. |
| 8,481,634 B2 | 7/2013 | Wang et al. |
| 8,511,111 B2 | 8/2013 | Lambert et al. |
| 8,597,552 B2 | 12/2013 | Koslow |
| 8,598,073 B2 | 12/2013 | Gadkaree et al. |
| 9,266,054 B2 | 2/2016 | McKenna et al. |
| 9,339,789 B2 | 5/2016 | Incorvia et al. |
| 2002/0083838 A1* | 7/2002 | Incorvia ............ F25B 43/003 96/135 |
| 2004/0219013 A1 | 11/2004 | Hopfensperger |
| 2005/0098495 A1 | 5/2005 | Hughes |
| 2005/0129952 A1 | 6/2005 | Sawada et al. |
| 2006/0096911 A1 | 5/2006 | Brey et al. |
| 2006/0141233 A1 | 6/2006 | Giangrasso |
| 2008/0202336 A1 | 8/2008 | Hofer et al. |
| 2010/0005968 A1* | 1/2010 | Endo ................ B32B 27/14 96/6 |
| 2010/0116134 A1 | 5/2010 | Zheng et al. |
| 2012/0067427 A1 | 3/2012 | Koslow |
| 2012/0070348 A1 | 3/2012 | Koslow |
| 2012/0097255 A1 | 4/2012 | Reed et al. |
| 2012/0103198 A1 | 5/2012 | Koslow et al. |
| 2012/0132074 A1 | 5/2012 | Koslow et al. |
| 2012/0211419 A1 | 8/2012 | Koslow |
| 2012/0295097 A1 | 11/2012 | Lotus et al. |
| 2013/0231875 A1 | 9/2013 | Beckett et al. |
| 2013/0306552 A1 | 11/2013 | Chamyvelumani et al. |
| 2014/0238071 A1 | 8/2014 | Brunschwiler et al. |
| 2015/0176894 A1 | 6/2015 | Yang et al. |
| 2015/0231576 A1* | 8/2015 | Stabler ............ B01D 41/04 210/500.35 |

FOREIGN PATENT DOCUMENTS

| | | |
|---|---|---|
| EP | 1566600 | 8/2005 |
| JP | 2009-106942 A | 5/2009 |
| JP | 2010-520805 A | 6/2010 |
| JP | 2012-508645 A | 4/2012 |
| JP | 2014-024706 A | 2/2014 |
| RU | 2329097 | 7/2008 |
| RU | 2446876 | 4/2012 |
| RU | 2475301 | 11/2012 |
| RU | 2475301 | 2/2013 |
| RU | 2481154 | 5/2013 |
| RU | 2543167 | 2/2015 |
| WO | 2014/055473 | 4/2014 |
| WO | 2014/0182861 | 11/2014 |
| WO | 2016/0168140 | 10/2016 |

OTHER PUBLICATIONS

Li, N. et al., "A Reusable Immobilization Matrix for the Biodegradation of Phenol at 5000 mg/L.", Scientific Reports, p. 5 (2015).
Mahle, J. et al., "Immobilized Filters for Air Filtration", Delaware University Newark Center for Composite Materials (2002).
Fuertes, A. et al., "Preparation and Characterization of Mesoporous Hybrid Particle-Fiber Carbon Monoliths", Advanced Engineering Materials, vol. 4.5, pp. 291-294 (2002).
Pinto, M. "The Use of Nanoporous Adsorbents in Filtering Mediator Improving Indoor Air Quality", Recent Patents on Nanotechnology, vol. 2.2, pp. 120-127 (2008).
Viklund, C. et al. "Monolithic, "Molded", Porous Materials with High Flow Characteristics for Separations, Catalysis, or Solid-Phase Chemistry: Control of Porous Properties During Polymerization", Chemistry of Materials, vol. 8.3, pp. 744-750 (1996).
Webpage featuring "Desiccant Solutions for the AC Industry" by Flow Dry Technology, http://www.flowdry.com/applications/automotive/desiccant-solutions-ac-php (at least as early as Oct. 26, 2016).
EP, European Patent Office, Extended European Search Report and Opinion, European Patent Application No. 17881908.2, 9 pages (Jun. 23, 2020).
PCT, International Search Report and Written Opinion, International Application No. PCT/US2017/062774 (Feb. 28, 2018).
US, Non-Final Office Action; U.S. Appl. No. 15/819,554, 15 pages (dated Aug. 8, 2019).
US, Final Office Action; U.S. Appl. No. 15/819,554, 12 pages (dated Feb. 24, 2020).
US, Notice of Allowance; U.S. Appl. No. 15/819,554, 10 pages (dated May 7, 2020).
Japan Patent Office, Notification of Reasons for Refusal (with English translation), Japanese Patent Application No. 2019-554473, 17 pages, dated Aug. 31, 2021.

* cited by examiner

METHOD OF USE FOR A SOLID FORM ADSORBENT

This application is a divisional of U.S. patent application Ser. No. 15/819,554 entitled SOLID FORM ADSORBENT, filed on Nov. 21, 2017, which claims priority to U.S. Provisional Application Ser. No. 62/435,164, entitled SOLID FORM ADSORBENT, filed on Dec. 16, 2016. The entire contents of both applications are hereby incorporated by reference.

This application is directed to an adsorbent, and more particularly, to an adsorbent in a solid or monolith form.

BACKGROUND

Adsorbent materials are widely used to remove water and certain other fluids, molecules, ions, or other contaminants from liquids and gasses. One particular use for adsorbents is for removing water and impurities from refrigerant fluids, such as in an automobile air conditioning system or the like. However existing adsorbent systems in such automobile air conditioning systems or the like can have certain shortcomings and drawbacks.

SUMMARY

Provided herein is a solid form adsorbent. The solid form adsorbent includes a plurality of discrete adsorbent particles spatially bound in place by point bonding by a binder. At least about 25% of the external surface area of a majority of the particles is not sealed off by the binder and is available for adsorption.

In some embodiments, at least about 25% of the external surface area of substantially all of the particles is not sealed off by the binder and is available for adsorption.

In some embodiments, the adsorbent particles have an average effective diameter of between about 0.1 micron and about 500 microns. For example, the adsorbent particles can have an average effective diameter of about 10 microns.

The binder of the adsorbent can be a polymer. In some embodiments, the binder includes a thermoplastic homopolymer, a copolymer resin, or a combination thereof. The binder can include a polyvinylidene fluoride (PVDF) resin.

In some embodiments, the solid form adsorbent includes about 5 wt. % to about 30 wt. % of the binder.

In some embodiments, the solid form adsorbent has a length to effective diameter ratio of at least about 1:1.

The solid form adsorbent can be generally cylindrical. The solid form adsorbent can also be generally cylindrical with a central opening extending therethrough.

In some embodiments, the adsorbent particles include a water-adsorptive material, a molecular sieve material, a zeolite powder, or a combination thereof.

The adsorbent particles can also include a zeolite, a metal-organic framework material, a zeolitic imidazolate framework material, a crystalline metal aluminosilicate having a three dimensional interconnecting network of silica and alumina tetrahedra, a porous glass, an active carbon, a clay, a silicon dioxide, a silica gel, a mesoporous silica, a calcium oxide, a calcium sulfate, an activated alumina, or a combination thereof.

In some embodiments, the adsorbent particles are sintered to the binder.

In some embodiments, the solid form adsorbent has voids formed therein that provide a volume of at least 10% of the solid form adsorbent.

The adsorbent can include about 70 wt. % to about 95 wt. % of the adsorbent particles.

In some embodiments, the binder has a lower melting point than the adsorbent particles.

In some embodiments, the adsorbent particles and the binder have a weight ratio of about 95:5 to about 75:25.

Also provided herein is an adsorbent system. The adsorbent system includes a solid form adsorbent and an air conditioning fluid path therein through which a refrigerant fluid is configured to flow, and wherein the adsorbent is positioned in the fluid path. The adsorbent includes a plurality of discrete adsorbent particles spatially bound in place by point bonding with a binder, wherein at least about 25% of the external surface area of a majority of the particles is not sealed off by the binder and is available for adsorption.

In some embodiments, the air conditioning fluid path is an air conditioning fluid path present in a condenser.

The solid form adsorbent can be generally cylindrical. The solid form adsorbent can also be generally cylindrical with a central opening extending therethrough. In some embodiments, the adsorbent includes a central opening extending therethrough, such that the refrigerant fluid can be extracted from or introduced into the condenser via the central opening.

Further provided herein is a method adding to or positioning in a vehicle air conditioning system a solid form adsorbent. The solid form adsorbent includes a plurality of discrete adsorbent particles spatially bound in place by point bonding with a binder. At least about 25% of the external surface area of a majority of the particles is not sealed off by the binder and is available for adsorption.

DETAILED DESCRIPTION

Figure 1:
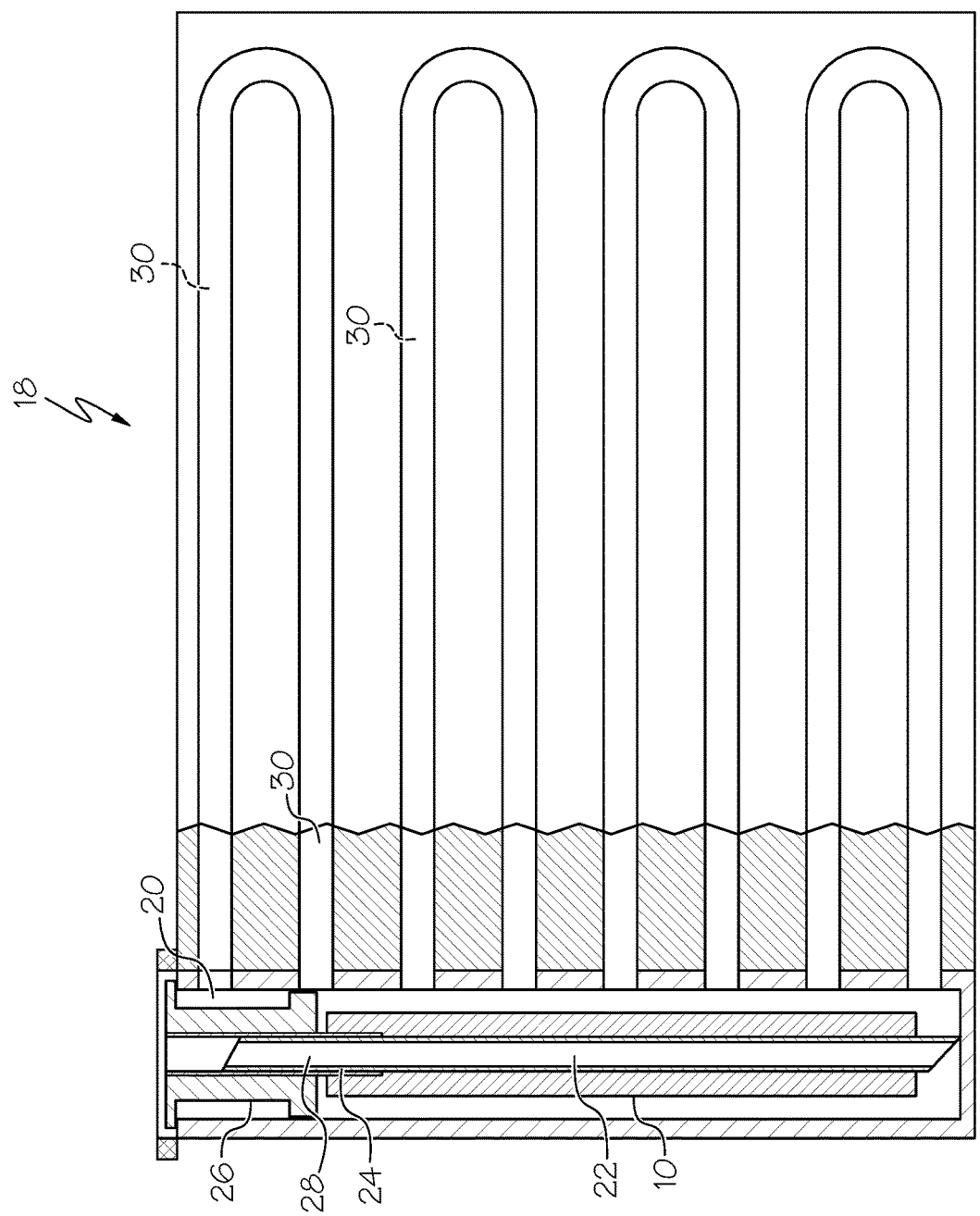
FIG. 1 is a front partial cross-sectional view of a condenser of an automobile air conditioning system, with one embodiment of the solid form adsorbent positioned therein.
Figure 2:
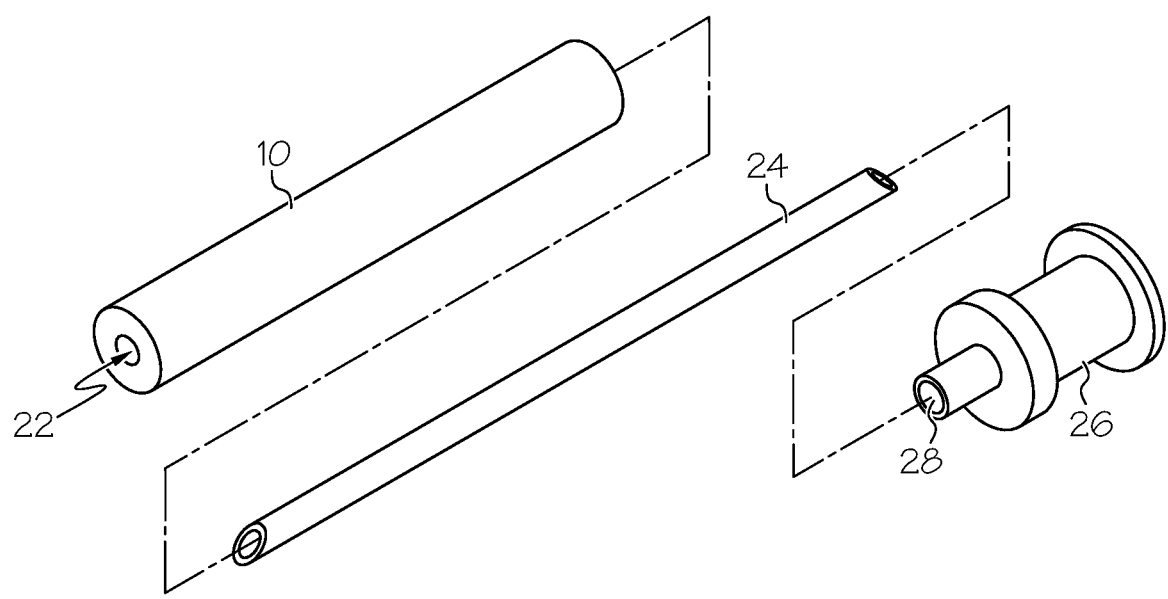
FIG. 2 is a perspective exploded view of the solid form adsorbent, tube and cap of FIG. 1.

In one embodiment the present invention takes the form of a solid form adsorbent having a plurality of fine adsorbent particles embedded or bound to a binder. In one embodiment the adsorbent particles, while bound to the binder, are not entirely sealed by or covered by the binder to ensure the particles remain available to adsorb moisture and the like. Such an adsorbent may have particular utility for use in automobile air conditioning systems, as will be described in greater detail below.

The adsorbent described and shown herein can take the form of a solid, monolithic structure utilizing or including adsorbent particles (such as a desiccant powder) immobilized by point-bonding with binder particles. Point-bonding can refer to materials bound together only at contact points. Such bonding often leads to materials with measurable void space where material volume is excluded due to packing inefficiencies.

The adsorbent particles can be made of any of a wide variety of materials known to have adsorbent properties and/or which adsorb water or the like. In some embodiments, the adsorbent particles include a molecular sieve, a desiccant material, or a combination thereof. For example, the adsorbent particles can include a zeolite, a metal-organic framework material (MOF), a zeolitic imidazolate framework material (ZIF), a crystalline metal aluminosilicate having a three dimensional interconnecting network of silica and alumina tetrahedra, a porous glass, an active carbon, a clay (e.g., montmorillonite and bentonite), a silicon dioxide, a silica gel, a mesoporous silica, a calcium oxide, a calcium sulfate, an activated alumina, or a combination thereof. The molecular sieve material can have a pore diameter of about 1 Angstrom to about 15 Angstroms, about 1 Angstrom to about 10 Angstroms, or about 1 Angstrom to about 5 Angstroms. For example, the molecular sieve material can have a pore diameter of about 3 Angstroms. Thus, in one case the molecular sieve material is designed to adsorb water, but not refrigerant fluid or system lubricant oil. The molecular sieve material may have a water capacity (weight %) of at least about 10% in one case, or at least about 20% in another case. For instance, the molecular sieve can have a water capacity of about 10% to about 50%, about 20% to about 40%, about 25% to about 35%, or about 28% to about 29%. The particles of adsorbent material can be a relatively fine powder/particulate, having an average size or diameter of between about 0.5 micron and about 500 microns, about 1 micron to about 300 microns, about 5 microns to about 100 microns, or about 8 microns to about 12 microns. In some embodiments the adsorbent particles can have an average size or diameter of about 5 microns, about 10 microns, about 100 microns, or about 500 microns.

As used herein, the term "about" as used herein can allow for a degree of variability in a value or range, for example, within 10%, within 5%, or within 1% of a stated value or of a stated limit of a range.

In some embodiments, the adsorbent includes about 70 wt. % to about 95 wt. % or about 80 wt. % to about 90 wt. % of the adsorbent particles. For example, the adsorbent can include about 80 wt. %, about 85 wt. %, or about 90 wt. % of the adsorbent particles.

The binder of the adsorbent can be any of a variety of materials, including a polymer. For example, the binder can include a thermoplastic homopolymer, a copolymer resin, or a combination thereof. In some embodiments, the binder includes a polyvinylidene fluoride (PVDF) resin (in one case sold as KYNAR® material sold by Arkema Inc. located in King of Prussia, Pa. USA), a polyolefin (such as polyethylene, polypropylene, and others), a polyamide (such as Nylon 6, Nylon 6,6, and others), a polyester (such as polyethylene terephthalate and others), a copolymer (such as ethylene-vinyl acetate and others), or a combination thereof. In some embodiments, the binder is a polytetrafluoroethylene (PTFE). The binder should be able to securely bind to the adsorbent particles and be inert to the ambient fluids in which the adsorbent is used (e.g. refrigerant fluid, oil, water, and other fluids found in automobile systems, in one case). The binder should also exhibit long term mechanical and chemical stability at the local environmental conditions of the system in which it is used (e.g., elevated temperature and pressure found in automobile air conditioning systems, in one case).

In some embodiments, the adsorbent includes about 5 wt. % to about 30 wt. % or about 10 wt. % to about 20 wt. % of the binder. For example, the adsorbent can include about 10 wt. %, about 15 wt. %, or about 20 wt. % of the binder.

The binder and adsorbent particles can be combined and formed into a single solid monolithic body by any of a variety of methods and systems. In one case, the adsorbent particles and the binder are both provided in a powdered form and mixed together to form a homogenous mixture. The binder can have an average diameter roughly equivalent to that of the adsorbent particle used, in the ranges as outlined above. In one case the adsorbent particles and the binder can have a weight ratio of about 95:5 to about 75:25 or about 90:10 to about 80:20. For example, the adsorbent particles and the binder can have a weight ratio of about 90:10, about 85:15, or about 80:20.

After the homogenous mixture is formed, the homogenous mixture can then be compression molded to produce the solid form of the adsorbent. Heat and/or pressure applied during the compression molding process can be controlled to ensure that the adsorbent particles are not entirely encapsulated in the binder, but instead retain sufficiently "exposed" adsorbent particle surfaces, or have sufficient uncovered surface area. The heat and/or pressure applied during the compression molding process can also be controlled so that the binder sufficiently binds to adjacent adsorbent particles and such that the binder does not reach its full melting temperature, which would cause the binder to flow and cover the adsorbent particles. The binding between the adsorbent particles and binder can arise from Van der Waals forces, hydrogen bonding, or both for example. In some embodiments, the binding between adsorbent particles and binder involves no covalent bonding or substantially no covalent bonding. The adsorbent particles can have a higher melting temperature than the binder such that the adsorbent material also does not melt.

Thus, the compression molding process can be considered to be a sintering process to form the solid mass adsorbent. The adsorbent particles become immobilized and spatially fixed while still retaining their adsorptive capability. The solid form adsorbent can have point bonding of the adsorptive particles, without adsorbent-adsorbent bonding, which would typically only occur at conditions that would result in loss of adsorptive capacity, mechanical integrity, or both.

Depending upon the parameters of the compression molding process, in some cases heat can be added during the compression molding process to ensure the binder material reaches its sufficient softening/binding/tacky state, such as its Vicat A softening temperature in one case. However, in other cases, the pressure applied to the mixture during the compression molding process generates sufficient internal heat in the mixture such that external heat is not required. In even other cases, the pressure generated in the compression molding process can cause excess heat in the mixture that is desired to be removed to ensure the binder material does not liquefy, and in this case cooling can be applied to the mixture during compression molding. The compression molding process can be carried out by any of a wide variety of structures, means or methods, but in one case a piston, or other ram-like implement, is used to compress the mixture within a cavity in a heated block mold. After the compression molding process is complete, the solid form adsorbent is allowed to cool slightly to below the softening point of the binder before being ejected from the mold block, after which it is further cooled.

In some embodiments, the surface area of the adsorbent includes about 5% to about 95% (by surface area) adsorbent particles. For example, the surface area of the adsorbent can include about 10% to about 40% or about 20% to about 30%, by surface area, adsorbent particles. The surface area of the adsorbent can also include about 60% to about 90% or about 70% to about 80%, by surface area, adsorbent particles.

The adsorbent can be partially coated with another material or can be free of any coating.

Figure 3:
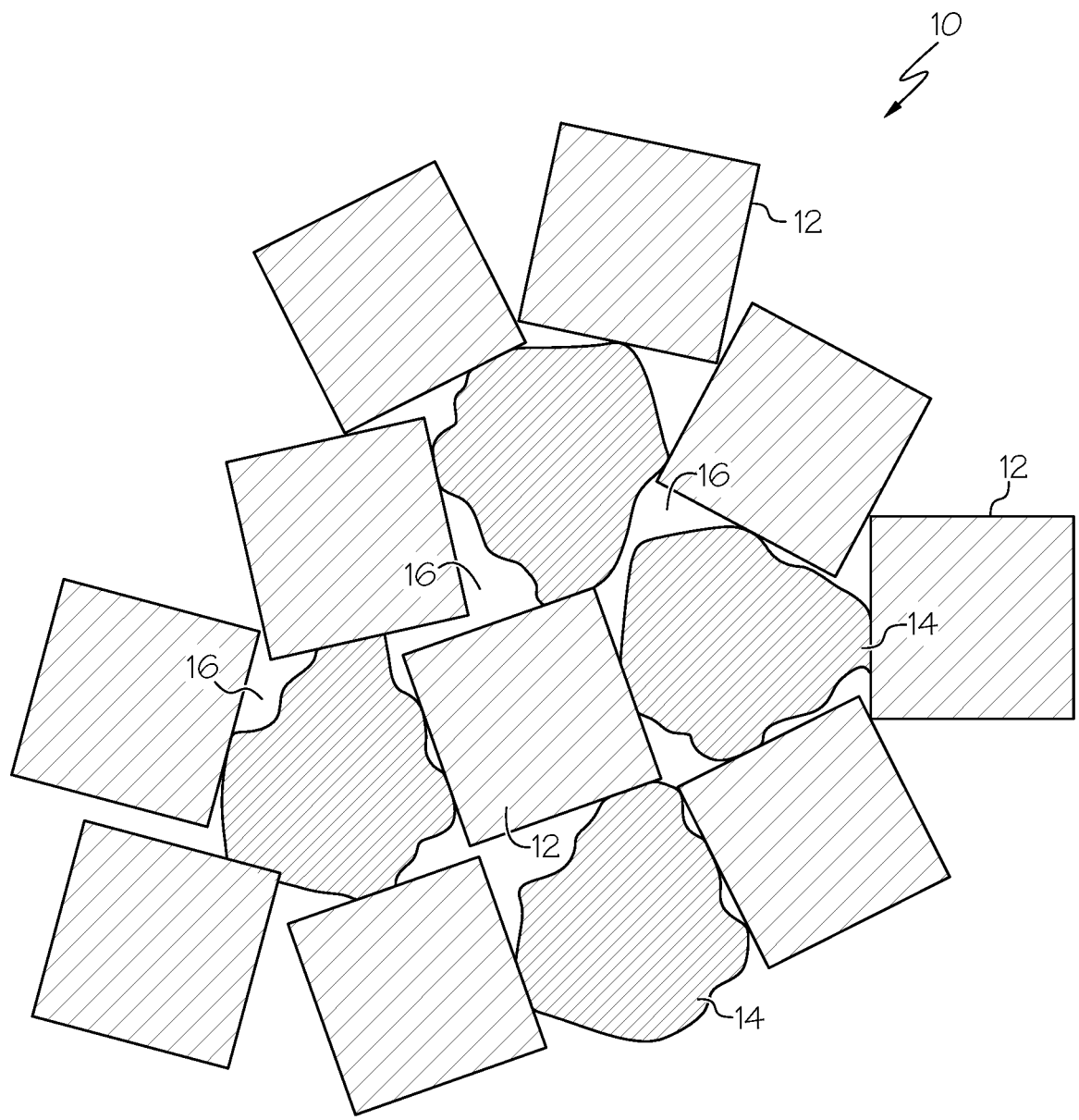
FIG. 3 is a schematic detail representation of one embodiment of the solid form adsorbent, showing a plurality of adsorbent and binder particles bound together.

A schematic representation of a cross section taken along part of a solid form adsorbent is shown in FIG. 3, showing the solid form adsorbent 10 having adsorbent particles 12 bonded to the binder particles 14, with voids 16 positioned in the solid form adsorbent 10. In one case, at least about 25% of the surface area of some, all, substantially all or a majority of adsorbent particles 12 are not sealed off by the binder/binder particles 14 and/or are exposed to the voids 16, and in this case about 75% of the surface area of the adsorbent particles 12 are available for adsorption such that the pores, channels and adsorption sites remain accessible and available for adsorption. The surface area of each adsorptive particle 12 that is not sealed off by the binder 14 is generally in contact with an adjacent adsorptive particle or particles 12 or exposed to open void space 16. In this case the voids 16 formed from the random packing of adsorptive particles 12 and binder particles 14 provide a network of tortuous pathways through the thickness of the solid form adsorbent 10, making all, or nearly all, or a majority of the adsorbent particles 12 and/or their surface area available to adsorb moisture or other undesirable materials. It is generally desired that the majority of adsorptive particles 12 and/or their surface area remain exposed while being sufficiently bonded to binder particles 14 to ensure a sufficiently rigid monolith. Thus compressive forces applied during compression molding should be controlled to prevent undue elimination of the voids 16.

For a solid form adsorbent 10 with 3-D pore networks, as long as some area of the adsorptive particles 12 are exposed, the entire particle 12 can be utilized for adsorption. However kinetic uptake of adsorbed material can be limited if too much surface area of the adsorbent particles 12 are covered by the binder 14. The solid form adsorbent 10 thus provides voids 16 throughout the structure. It is this network of voids 16 that allows rapid kinetic uptake of adsorbates from the primary fluid. In one case, then, the solid form adsorbent 10 has voids 16 in the range of between about 10% and about 60% by volume; or greater than about 10% in one case or greater than about 25% in another case, or less than about 60% or less than about 50% in another case.

As a specific example, 15% by weight of Kyblock® FG-81 (Arkema Inc., King of Prussia, Pa., USA), a binder, and 85% by weight of Siliporite® NK 30AP (CECA SA, Colombes, FRA), an adsorbent, were mixed by hand in a stainless steel mixing bowl for 5 minutes. The homogeneous powder mixture was then positioned in a thick-walled stainless steel pipe, the inside surface of which served as the outer mold surface. A small piston was fit inside the bottom portion of the pipe to both retain the loose powder mixture inside the mold and to apply compressive forces. The piston included a hole formed in its center to receive a mandrel which formed the inside mold surface for a solid adsorbent having an annular cross section. The powder mixture was placed in the pipe, around the central mandrel, a few grams at a time before being firmly tamped to remove entrapped air using a rod shaped to fit over the central mandrel. When sufficient powder mixture had been added and tamped into the mold, an arbor press was used to further compress the powder to an apparent density of approximately 0.85 g/cc. The densified powder was then heated in an oven at 450° F. for 1 hour. The heated compression mold assembly was removed from the oven and pressed at between 1,000 and 10,000 psi to achieve a final apparent density of approximately 1.18 g/cc. The mold was allowed to cool before the solid adsorbent form was ejected from the mold.

Although the example above provide details regarding a compression molding process for forming the solid form adsorbent, it should be understood that the solid form adsorbent can be formed by any of a variety of other methods besides compression molding. For example, the homogenous mixture described above can be formed and then placed in an extruder, such as a screw extruder in one case, and extruded to provide a solid form adsorbent with partially exposed adsorbent particles as outlined above. Compression forces during molding/formation can be provided by any of a wide variety of mechanisms, devices or structures, such as by a hydraulic or mechanical punch and die arrangement. However one advantage with the extrusion forming process is that the internal temperature of the mixture may be able to be more accurately controlled.

The solid form adsorbent can be formed into any of a wide variety of shapes and configurations as desired, depending upon the desired end use application. In one case the solid form adsorbent is generally tubular or cylindrical. However it should be understood that the solid form adsorbent can have other shapes or cross sections besides circular, such as triangular, square, rectangular, hexagon, or other (regular or irregular) geometric or other shapes. When the solid form adsorbent is in a cylindrical shape, it can have a length/diameter ratio of at least about 1:1 in one case, or at least about 4:1 in another case, or at least about 8:1 in yet another case resulting in a relatively long/thin cylinder. In cases where the solid form adsorbent has shapes other than cylindrical, it can have similar length/effective diameter ratios, where an effective diameter can be calculated by determining a diameter for a circle required to provide an equivalent cross sectional area.

As shown in FIG. 1, in one particular aspect of use, the solid form adsorbent 10 can be used in conjunction with a condenser 18 of an automobile air conditioning system. In this case the condenser 18 can include a receiver-dryer tube 20 positioned to one side of the condenser 18. The illustrated solid form adsorbent 10 is a relatively long and thin cylindrical shape, enabling the solid form adsorbent 10 to closely fit into the receiver-dryer tube 20.

In the illustrated embodiment the solid form adsorbent 10 includes a central, axially-extending opening 22 throughout its entire length. The opening 22 can be configured to receive a pick-up tube 24 therein. The tube 24, in turn, may be sized and configured to receive a filter cap 26 thereon, such as in a press-fit or interference fit manner. The filter cap 26 is configured to sealingly fit into an upper end of the receiver-dryer tube 20 of the condenser 18 to seal the condenser 18, and can include a filter medium therein. The filter cap 26 also includes a central opening 28 that is coupled to and in fluid communication with the tube 24. In this manner any fluid (i.e. refrigerant fluid) in the condenser 18 can be removed from the condenser 18 by applying a suction force to the filter cap 26, which will cause refrigerant fluid to be sucked up through the tube 24 and removed. Conversely replacement refrigerant fluid can be introduced into the compressor 18 via the cap 26 and the tube 24. The condenser 18 includes a plurality of internal paths 30 through which refrigerant fluid flows, and the internal paths 30 are in fluid communication with the receiver-dryer tube 20. In this manner the solid form adsorbent 10 can adsorb water and other undesirable fluids in the refrigerant fluid.

The adsorbent can also be placed in other locations of an automobile air conditioning system such as in the flow path to the expansion valve or to/from the compressor.

In many current designs of adsorbent systems utilized in automotive air conditioning systems, a porous, non-woven polyester felt bag is filled with adsorbent beads of approximately 2 millimeter diameter to form a adsorbent package. The adsorbent package is often made using a vertical, form, fill, seal ("VFFS") machine designed specifically for this purpose. However, many existing VFFS machines are designed for adsorbent packages that have a roughly one to one length-to-width ratio. In contrast, many current automotive air conditioning systems require a relatively high length-to-width (or length-to-diameter) ratio. Thus, when filling such a narrow bag with beads using current VFFS machines, the small width or mouth of the bag significantly increases the time required to fill the bag.

In addition, there are inherent drawbacks with the use of existing adsorbent packages. In particular, the adsorbent beads are typically an agglomeration of small adsorbent particles or powder formed into a larger solid bead. In existing adsorbent packages, the individual loose adsorbent beads, contained in the bag, are subject to movement inside the bag due to movement and vibration of the air conditioning system/vehicle. When the relatively rough-surfaced beads move relative to each other, the rubbing action causes abrasion of the small particles from the beads. The small, abraded particles can escape from the porous bag and then circulate throughout the air conditioning system. The escaped adsorbent particles can cause premature wear of moving parts within the air conditioning system, such as the compressor and thermal expansion valve, and can also plug small orifices in the systems. In addition, the bag, typically made of non-woven material, can adsorb liquid refrigerant and lubricating oil. This requires extra oil and refrigerant fluid to be added to the air conditioning system. Finally, existing adsorbent packages utilizing a bag with adsorbent beads presents certain limitations to the shape of the adsorbent system.

In contrast, the solid form adsorbent disclosed herein overcomes many disadvantages of existing adsorbent packages described above. In particular, the solid form monolith adsorbent structure is an agglomeration of small adsorbent particles or powder into one large construct. Thus, unlike use of multiple beads which can move against each other, the monolith structure is held in place and is low or non-dusting. Less dust results in less wear of moving parts in the air conditioning system and provides less risk of system plugging. The solid form adsorbent system is also relatively easy to form, and avoids the "bottleneck" filling of a relatively narrow bag with adsorbent beads.

The solid form adsorbent monolith structure also provides a more dense adsorbent structure by eliminating or reducing the large interstitial spaces between beads, and also eliminates the empty head space of an adsorbent bag structure. In this manner, the solid form adsorbent monolith structure provides more adsorbate drawing capacity per unit volume than existing bags loose-filled with adsorbent beads. In addition, since the use of a solid form adsorbent enables the bag to be eliminated, the resultant absorption by the bag of liquid refrigerant and lubricating oil is correspondingly eliminated. The solid form adsorbent monolith can be easier and faster to position in the condenser, and can be done with automated equipment.

In some embodiments, the adsorbent monolith can have can have a diameter of about 15 millimeters (mm) to about 35 mm or about 20 mm to about 30 mm. The adsorbent monolith can have a length of about 100 mm to about 400 mm or about 150 mm to about 300 mm.

Finally, since the adsorbent disclosed herein can be formed in a solid form, the adsorbent can act as a structural component in the automotive air conditioning system, or other systems in which the solid form adsorbent is utilized. For example, in the embodiment shown in FIG. 1, if desired the tube 24 may be eliminated, and the cap 26 instead directly coupled to the solid form adsorbent 10. In this case, the central axial opening 22 of the solid form adsorbent 10 can be generally fluid-tight and act as a sealed tube for the removal of fluid (even though the adsorbent 10 can be adsorptive, the solid-form adsorbent 10 can be sufficiently fluid tight, and adsorption can take place at a sufficiently low rate, that fluid can nevertheless be removed through the opening 22 by suction). In addition, the solid form adsorbent monolith can have any of a wide variety of shapes or forms besides that shown herein and can be shaped and configured to, for example, enhance and increase the surface area to allow for a controlled rate of adsorption.

In addition, the solid form adsorbent can include filtration properties, thereby eliminating the need for a separate filter device. For example, the solid form adsorbent can be formed in a particular shape to replace existing injection or extruded plastic parts and/or to replace a filter system with a filtration grade immobilized adsorbent.

Having described the invention in detail and by reference to the various embodiments, it should be understood that modifications and variations thereof are possible without departing from the scope of the claims of the present application.

What is claimed is:

1. A method comprising:
adding to or positioning in a vehicle air conditioning system, in a fluid path through which a refrigerant fluid is configured to flow, a solid form adsorbent comprising a plurality of discrete adsorbent particles spatially bound in place by point bonding with a binder, wherein said adsorbent particles have an average effective diameter of between about 0.1 micron and about 500 microns, and wherein at least about 25% of the external surface area of a majority of the adsorbent particles is not sealed off by the binder and is available for adsorption, such that at least part of the refrigerant fluid flows about the solid form adsorbent, and the solid form adsorbent is sufficiently fluid-tight that said at least part of the refrigerant fluid flowing about the solid form adsorbent primarily flows along an outer surface of the solid form adsorbent or an opening extending therethrough that is free of bound discrete adsorbent particles.

2. The method of claim 1 wherein the solid form adsorbent has voids formed therein that provide a volume of at least 10% of said solid form adsorbent.

3. The method of claim 1 wherein at least about 25% of the external surface area of substantially all of the adsorbent particles is not sealed off by the binder and is available for adsorption.

4. The method of claim 1 wherein said binder is a polymer.

5. The method of claim 1 wherein the binder comprises a thermoplastic homopolymer, a copolymer resin, or a combination thereof, or a polyvinylidene fluoride (PVDF) resin, or polyamide.

6. The method of claim 1 wherein said binder comprises about 5 wt. % to about 30 wt. % of the solid form adsorbent.

7. The method of claim 1 wherein said solid form adsorbent is cylindrical and has a length to effective diameter ratio of at least about 4:1.

8. The method of claim 1 wherein said adsorbent particles comprise a water-adsorptive material, a molecular sieve material, a zeolite powder, or a combination thereof.

9. The method of claim 1 wherein said adsorbent particles comprise a zeolite, a metal-organic framework material, a zeolitic imidazolate framework material, a crystalline metal aluminosilicate having a three dimensional interconnecting network of silica and alumina tetrahedra, a porous glass, an active carbon, a clay, a silicon dioxide, a silica gel, a mesoporous silica, a calcium oxide, a calcium sulfate, an activated alumina, or a combination thereof.

10. The method of claim 1 wherein said adsorbent particles are sintered to the binder, and wherein the adsorbent particles contribute between about 70% and about 95% of a weight of the solid form adsorbent.

11. The method of claim 1 wherein said binder has a lower melting point than the adsorbent particles.

12. The method of claim 1 wherein said adsorbent particles and said binder have a weight ratio of between about 95:5 and about 75:25.

13. The method of claim 1 wherein said solid form adsorbent is added or positioned in said fluid path such that the outer surface of the solid form adsorbent is configured to be directly exposed to at least part of the refrigerant fluid flowing around said solid form adsorbent.

14. The method of claim 1 wherein said fluid path is an air conditioning fluid path in a condenser.

15. The method of claim 1 wherein the solid form adsorbent is positioned and arranged such that at least a portion of refrigerant fluid is able to access the outer surface of the solid form adsorbent in a radial direction.

16. The method of claim 1 wherein said solid form adsorbent has a uniform cross sectional shape and has an axially-extending opening extending therethrough, through which at least a portion of the refrigerant fluid is configured to flow in direct contact with the solid form adsorbent.

17. The method of claim 1 wherein the vehicle air conditioning system lacks a housing in which the solid form adsorbent is positioned and which directly engages a radially outer surface of the solid form adsorbent, to thereby enable the radially outer surface to be directly exposed to a refrigerant fluid.

18. The method of claim 1 further comprising a step of causing a fluid to circulate in the vehicle air conditioning system such that the fluid is exposed to the solid form adsorbent which adsorbs at least part of any water contained in said fluid.

* * * * *